United States Patent [19]

Sander et al.

[11] 4,454,402

[45] Jun. 12, 1984

[54] INDUCTION WELDING APPARATUS FOR LAMINATED TUBES

[75] Inventors: Engelbert Sander; Rudolf Jeker, both of Vouvry, Switzerland

[73] Assignee: Automation Industrielle SA, Vouvry, Switzerland

[21] Appl. No.: 294,226

[22] Filed: Aug. 19, 1981

[30] Foreign Application Priority Data

Aug. 26, 1980 [DE] Fed. Rep. of Germany ....... 3032118

[51] Int. Cl.$^3$ .............................................. H05B 6/40
[52] U.S. Cl. .......................... 219/10.53; 219/10.49 R; 219/10.79; 219/10.43; 219/10.57; 156/272.4; 156/379.7
[58] Field of Search ...................... 219/10.53, 10.49 R, 219/10.73, 10.79, 10.75, 10.57, 10.43; 156/272.4, 274.2, 273.9, 379.6, 379.7, 380.2

[56] References Cited

U.S. PATENT DOCUMENTS

| 2,383,992 | 9/1945 | Sherman | 219/10.79 X |
|---|---|---|---|
| 3,460,310 | 8/1969 | Adcock et al. | 219/10.53 X |
| 3,700,513 | 10/1972 | Haberhaugr et al. | 219/10.53 |
| 3,706,176 | 12/1972 | Leatherman | 219/10.53 X |
| 3,727,022 | 4/1973 | Hamilton | 219/10.53 X |
| 3,808,074 | 4/1974 | Smith et al. | 219/10.43 X |
| 3,832,509 | 8/1974 | Mikhailov et al. | 219/10.79 X |
| 4,152,566 | 5/1979 | Mägerle | 219/10.53 |

FOREIGN PATENT DOCUMENTS 2628014  1/1977  Fed. Rep. of Germany .

*Primary Examiner*—B. A. Reynolds
*Assistant Examiner*—Philip H. Leung
*Attorney, Agent, or Firm*—Paul J. Cook

[57] ABSTRACT

A die-welding apparatus for connecting a tube body formed of a composite material having a plastic layer and a metallic layer including a die formed of a non-ferrous metal and having a radial slot and a hollow induction coil having one turn electrically conductively connected to the die, but which does not electrically bridge the slot.

9 Claims, 3 Drawing Figures

INDUCTION WELDING APPARATUS FOR LAMINATED TUBES

BACKGROUND OF THE INVENTION

The invention relates to a die-welding coil for connecting tube bodies of composite foils having a metallic barrier layer and a plastic layer with a tube head by high-frequency induction welding, consisting of a cylindrical shaping die provided with an axial bore and of a hollow induction coil which may be connectable to a cooling agent source.

Ger. Pub. Sp. No. 26 28 014 discloses a die-welding coil having a die that serves as pressing tool and that is formed of an electrical non-conductor, such as a ceramic material. An induction coil cooperates with this pressing tool. Since electrical non-conductors, in general, and especially ceramics, are relatively poor heat conductors, the removal of heat from the welding zone in a short time is not possible, so that the number of welded connections which can be produced per unit of time is low. Moreover, the ceramic body heats up in time and effects a variation of the surface of the outer layers of the tube head shoulders; that is the synthetic plastics material loses its gloss and becomes undesirably matted. Furthermore, in the case of ceramic materials, there is always a danger of breakage on application of the necessary pressure in welding, since they are brittle, hard and difficult to work.

Ger. Pub. Sp. No. 20 23 652 discloses an induction coil consisting of a hollow conductor that can be cooled by means of a cooling agent conducted through the hollow conductor. According to this specification, the tubular body consists of thermally conductive aluminum and only its head attached at the end consists of non-conductive material in order to improve thermal conductivity away from the mandrel. This, however, only inappreciably improves the conducting of heat away from the welding zone. From this specification, it is also known to arrange the induction coil separately from the pressing die above the guide path of the mandrel and to move the tube parts to be welded with attached die through the induction field of the stationary coil.

The Ger. Pub. Sp. No. 26 28 014 discussed above also suggests arranging the induction coil in the mandrel and screening off the field in the tube, since then the possibility exists of producing the pressing die from metal in order to shorten the cooling time after the welding process. This arrangement, however, has a number of disadvantages since the coil and the requisite cooling and screening devices must be accommodated in the mandrel, where space is limited. Since the mandrel also must be movable in several directions, problems associated with transport of current and cooling agent are increased. Furthermore, only the marginal area of the coil can be exploited.

In the prior art arrangements, it is also not possible to heat specific parts more or less by specifically concentrated magnetic fields, since the coil opening is always larger than the tube head to be welded.

SUMMARY OF THE INVENTION

The invention provides a die-welding coil which renders it possible to accelerate the welding process of tube bodies having a metallic barrier layer with a tube head by improved cooling and, especially in the case of tube heads having a metallic barrier layer, additionally by directed energy distribution in the welding.

The present invention provides a die-welding coil construction for welding composite foils having a metallic barrier layer to a tube head by high frequency welding. The die includes a shaping bore and a hollow induction coil that can be connected to a source of cooling fluid. The shaping die is made of a non-ferrous metal and has a radial slot extending from the bore to the outer edge. The coil is connected electrically conductively with the shaping die about one turn length but does not bridge the slot.

This configuration of the die with gap achieves the object that the metal die does not act as screening of the magnetic field but as concentrator, so that the entire field flux can pass only through the axial opening, and since metal is a good conductor of heat a nearly optimum conducting away of heat can also be achieved in the welding zone. Furthermore, as the die is of metal the pressure necessary for a good seal can be applied without danger of fracture of the die.

DESCRIPTION OF SPECIFIC EMBODIMENTS

In one embodiment, the slot is filled with an electrically non-conductive material so that any softened synthetic plastics material cannot pass into the slot, thereby avoiding a possible linear raised portion on the surface of the shoulder part. Optimum formation of the induction field is achieved by having the outside surface of the die adjacent the induction coil as a conical shape. By arranging the die and coil as a unit capable of movement, one relative to the other, it is possible firstly to use the same coil with shaping dies adapted to different tube forms, and on the other hand to permit the shaping dies to travel with the tubes, whereby a further increase of speed is possible.

By forming the die by an upper part and a lower part, a basic body of the die can be provided with inserts adapted to different tube forms, so that the production costs are reduced and possibly also the re-fitting times are shortened.

By providing the die with passages for cooling fluid, improved cooling of the die can be achieved.

By utilizing a guide sleeve with a conically shaped entry configuration made of an electrically non-conduction material, easy introduction and precise centering of the mandrel with the tube body and the head in relation to the coil is guaranteed.

An insulating washer on the inner side of the die is used preferably when the tube head has a metal barrier layer acting as a screening, so that the insulating washer is directly penetrated by an increased secondary field which is concentrated in the zone of overlap of tube head and tube body. Securing of the insulating washer between the mating parts of the die renders possible on the one hand a firm seating, but on the other hand also easy replacement and securing of a different insulating washer with greater or lesser thickness.

Figure 1:
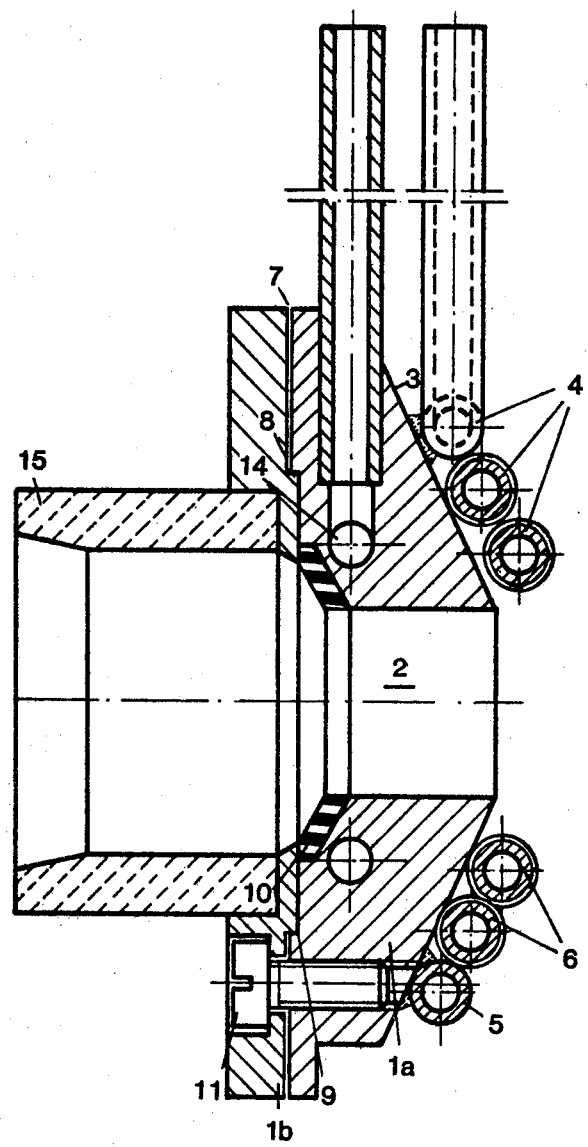
Figure 2:
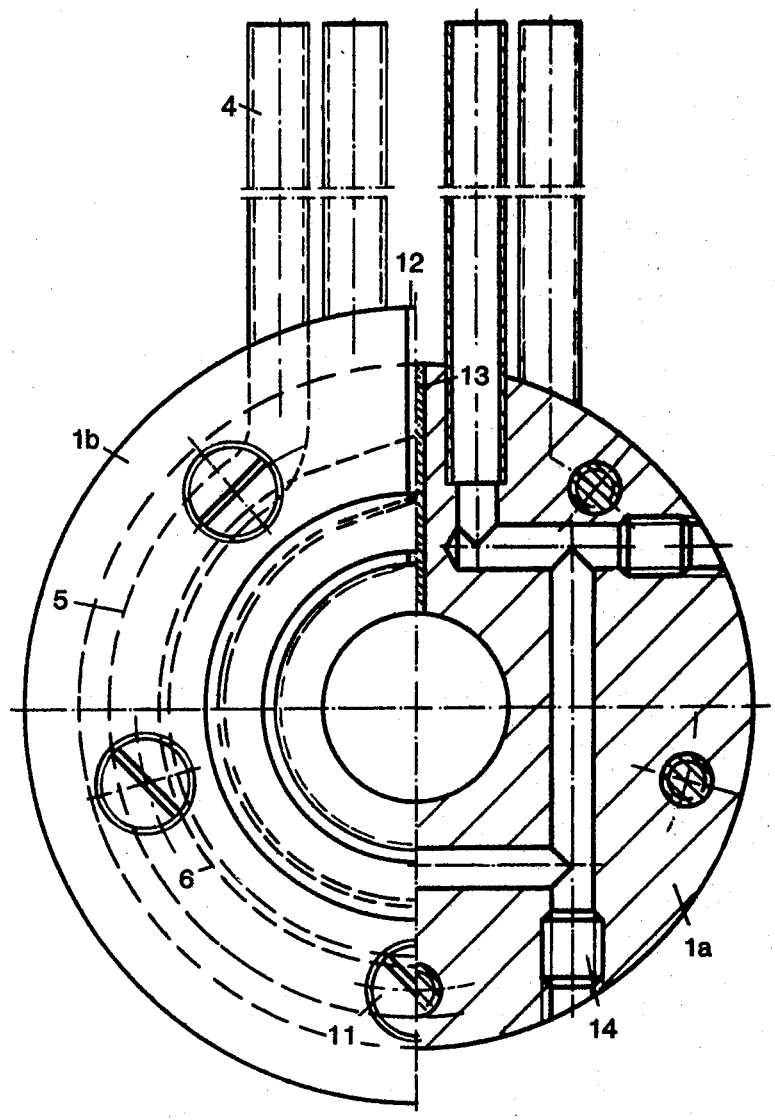
Figure 3:
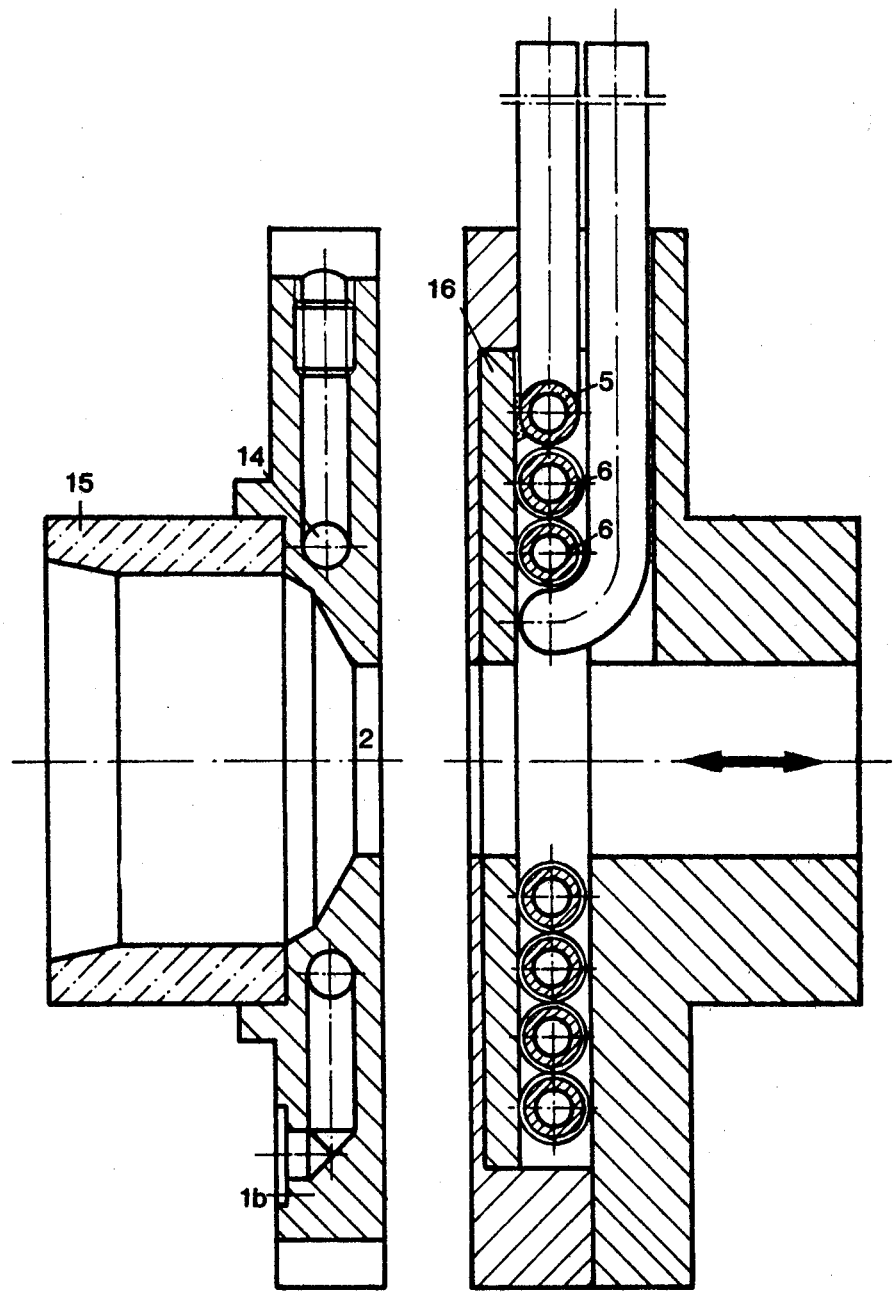

The invention will be explained in greater detail below by reference to examples of embodiment with the aid of drawings, wherein:

FIG. 1 shows an example of embodiment of a die-welding coil with insulating washer, FIG. 2 shows a view of the die-welding coil according to FIG. 1 from beneath, with a view through and a partial section, FIG. 3 shows another example of embodiment in which the coil part is separated from the divided die part, without insulating washer.

The die-welding coil as represented in FIGS. 1 and 2 consists of a shaping die 1 of a non-ferrous metal, consisting of an upper part 1a and a lower part 1b.

The shaping die 1 has a through-passing axial bore 2. The upper part 1a comprises a frusto-conical surface 3 on which an induction coil 4 is arranged in spiral form. The high-frequency induction coil is soldered with about one turn 5—the outer—on the die 1 and thus conductively connected with it. The further turns are arranged insulated from the shaping die 1.

The upper part 1a of the shaping die 1 has a circular recess 8 on the under side 7 which a corresponding protuberance 9 of the lower part 1b of the shaping die 1 enters. An insulating washer 10 is arranged around the axial bore 2 between the upper and lower parts 1a and 1b. The two parts 1a and 1b are detachably connected with one another by screw connections 11 and clamp the insulating washer 10 in between them, so that it is easily replaceable. The recess 8 and the protuberance 9 serve for easier centered assembly of the parts 1a and 1b of the shaping die 1, and their height is adapted to the maximum thickness of the utilized insulating washers 10; that is to say, even in the case of the greatest thickness, there is still engagement of the protuberance 9 in the recess 8. The shaping die 1 has on one side a radially through-extenting slot 12 which is as narrow as possible. The slot 12 is filled with an electrically non-conductive filling composition 13.

The one turn 5 soldered to the shaping die 1, that is to say electrically conductively connected, begins on one side of the slot 12 and ends before the other side, that is to say, the slot 12 is not electrically conductively bridged.

The induction coil 4 is formed as a hollow conductor and can be cooled by a cooling agent.

The die 1 has a system of passages 14 for the passage of a cooling agent and the passages 14 can be arranged in the upper and lower parts 1a and 1b or only in one part 1a or 1b.

A guide sleeve 15 of electrically non-conductive material is secured to the under side of the lower part 1b. At the free end, the guide sleeve 15 has bevelled edges for easier introduction of the mandrels carrying the tube bodies and tube heads. The guide sleeve 15 is so dimensioned and arranged that it precisely surrounds the mandrel with the tube body and centers it in relation to the induction coil 4.

The axial bore 2 in the lower part is widened so that it reproduces the external form of the finished tube shoulders, at least in the region of the connection of the head with the tube body. This widening can be formed only in the lower part 1b or in the upper part 1a as well, and the insulating washer 10, if present, is included in the shaping (see FIG. 1).

In the example of embodiment as illustrated in FIG. 3, the system of passages 14 is arranged in the lower part 1b of the die 1. The inner form of the widening of the axial bore 2, reproducing the shoulder form of the tube to be produced, is contained only in this part 1b. In the case of this embodiment, the coil 4 is arranged on a metallic concentrator disc 16 with slot and is movable upwards and downwards in relation to the die 1 in its longitudinal axis. The coil turn 5 and the retaining ring 16 are so arranged and formed that the slot 12 of the die is not electrically bridged.

In the case of a tube head without metallic layer, the tube body having a metallic barrier layer is pushed on to the head shoulder; the metal layer is heated in the zone of overlap by the field generated by the induction coil and softens the synthetic plastics layers adjacent to it. The desired firm connection is achieved by the pressure applied by the dies.

If the tube head has likewise a metallic barrier layer, a short-circuit current is effected therein by the induced field, which likewise generates heat and a magnetic reaction which counteracts the main field.

The intensity of the currents induced in the metallic layer of the tube head can be determined by the insulating washer 10, which renders possible a dividing up of a part of the field. The secondary field directly penetrates the insulating washer 10 and is concentrated in the zone of overlap of head and tube body, where it brings about a directed heating. The intensity of the induced current can be varied by the thickness of the insulating washer 10.

The current flowing through the coil effects the buildup of a magnetic field which is influenced by the die 1 acting as concentrator so that the entire field flux passes only through the bore 2. The concentration of the field is thus determined by the configuration of the bore 2, especially by its width of opening, but also by it depth. By suitable selection of the width of opening of the bore 2 of the die 1 and by the thickness of the insulating washer 10, it is possible to achieve a directed distribution of energy in welding.

The die consists preferably of brass, since this is preferred to copper on account of its hardness. However, all non-ferrous metals are usable.

As insulating filling composition, there can be used, for example, a two-component synthetic resin adhesive on the basis of an epoxy resin, for example Araldite. The insulating washer can be manufactured, for example, from aluminum oxide or another ceramic material such as a glass with inorganic fillers (Havelex or Marcor). A material of lower hardness suffices for the guide sleeve, for which reason, on account of simpler workability, a synthetic plastics material is used, for example, a carbon fluoride resin such as polytetra-fluoroethylene (Teflon).

We claim:

1. Die-welding coil apparatus for connecting a tube body formed of a composite foil having a metallic barrier layer with a tube head, by high-frequency induction welding, comprising a cylindrical shaping die provided with an axial bore, a hollow induction coil which is connectable to a cooling agent source, a shaping die formed of a non-ferrous metal, a radial slot extending between the axial bore and an outer surface of the shaping die and said coil having a plurality of turns surrounding the shaping die and connected electrically conductively with the shaping die by about one turn length, said about one turn length not electrically bridged over the slot whereby a secondary field flux generated by electrical current passed through said coil includes a secondary field through said axial bore is concentrated in a zone of overlap of said tube body and said tube head.

2. The die-welding coil apparatus according to claim 1 characterized in that the slot is filled with an electrically non-conductive filling composition.

3. The die-welding coil apparatus according to claim 1 or 2 characterized in that the die has a conical outer surface on which the induction coil is arranged in spiral form.

4. The die-welding coil apparatus according to either claim 1 or 2 characterized in that the coil and the die are each formed as a unit and are arranged for movement in relation to one another.

5. The die-welding coil apparatus according to either claim 1 or 2 characterized in that the shaping die is divided and consists at least of an upper part and a lower part.

6. The die-welding coil apparatus according to either claim 1 or 2 characterized in that the die contains passages for the through-flow of a cooling fluid.

7. The die-welding coil apparatus according to either claim 1 or 2 characterized in that the die is connected with a guide sleeve with entry opening of conical configuration of an electrically non-conductive material.

8. The die-welding coil apparatus according to either claim 1 or 2 characterized in that an insulating washer is provided on the inner side of the die facing a shoulder part of the tube head.

9. The die-welding coil apparatus according to either claim 1 or 2 characterized in that an insulating washer is provided on the inner side of the die facing a shoulder part of the tube head and that the insulating washer is secured by clamping between an upper part and a lower part of the shaping die, the two parts being detachably connected with one another.

* * * * *